United States Patent [19]
Morgan

[11] Patent Number: 5,442,409
[45] Date of Patent: Aug. 15, 1995

[54] MOTION VECTOR GENERATION USING INTERLEAVED SUBSETS OF CORRELATION SURFACE VALUES

[75] Inventor: W. A. David Morgan, Farnham, United Kingdom

[73] Assignee: Sony Corporation, Tokyo, Japan

[21] Appl. No.: 201,359

[22] Filed: Feb. 24, 1994

[30] Foreign Application Priority Data

Jun. 9, 1993 [GB] United Kingdom ............... 9311852

[51] Int. Cl.$^6$ .......................... H04N 7/28; H04N 7/01
[52] U.S. Cl. .................................... 348/699; 348/441
[58] Field of Search .......... 348/699, 700, 701, 402, 348/407, 416, 452, 441; H04N 7/13, 7/137, 7/01

[56] References Cited

U.S. PATENT DOCUMENTS

| | | | |
|---|---|---|---|
| 4,873,573 | 10/1989 | Thomas et al. ............. | 348/416 |
| 4,890,160 | 12/1989 | Thomas ........................ | 348/699 |
| 4,974,084 | 11/1990 | Fernando ..................... | 348/699 |
| 4,992,869 | 2/1991 | Samad et al. ................ | 348/699 |
| 5,008,744 | 4/1991 | Fernando et al. ............ | 348/429 |
| 5,181,111 | 1/1993 | Hedley et al. ............... | 348/701 |
| 5,347,312 | 9/1994 | Saunders et al. ............. | 348/700 |

FOREIGN PATENT DOCUMENTS 2231749 11/1990 United Kingdom .

Primary Examiner—Tommy P. Chin
Assistant Examiner—Bryan S. Tung
Attorney, Agent, or Firm—William S. Frommer; Alvin Sinderbrand

[57] ABSTRACT

A system for generating motion vectors from image data calculates correlation surface values representing image correlation between temporally adjacent images. The system provides a stream of correlation surface values comprising interleaved subsets of correlation surface values from differing correlation surfaces, each subset being a portion of a correlation surface. The system also provides a correlation surface analyzer for receiving the stream of correlation surface values and determining partial result values for motion vectors, a buffer memory for storing the partial result values, and an apparatus for reading out final result values of motion vectors for a given correlation surface.

9 Claims, 6 Drawing Sheets

MOTION VECTOR GENERATION USING INTERLEAVED SUBSETS OF CORRELATION SURFACE VALUES

BACKGROUND OF THE INVENTION

1. Field of the Invention

This invention relates to motion vector generation of the type typically used within motion compensated image interpolation systems.

2. Description of the Prior Art

Motion compensated image interpolation for purposes such as standards conversion is known, e.g. conversion from film to television or from one television format to another. An example of such a system is described in British Published Patent Application GB-A-2,231,749 (Sony Corporation).

An important step in motion compensated interpolation systems is the generation and analysis of correlation surfaces to identify motion vectors. More particularly, the correlation surfaces are analyzed to find the point of maximum correlation (this may correspond to a minimum in a correlation surface), assess the validity of this point by means of various tests and output an appropriate motion vector determined by the position of the correlation maximum in the correlation surface. In addition, growing, weighting and interpolation techniques may be used to refine the process and improve reliability.

In known systems, each correlation surface is separately analyzed one at a time in a correlation surface sequential fashion. The analysis is done in this way to ease the process of finding values of maximum correlation within a surface by requiring only one (best known result) to be stored at any one time. A problem with this approach is that the input image data upon which the system operates is provided in a raster scan format across the entire image. In order that the correlation surfaces can be analyzed in a correlation surface sequential fashion, it is necessary that the data for each correlation surface, which in fact originates from only a portion of the overall image, be presented together to the analysis system.

This places a requirement that the data stream passing through the device is reformatted (re-ordered/"twisted") from a raster scan order based upon the whole image to a series of raster scans through each correlation surface representing only a portion of the image. Such a reformatting requires a disadvantageously large block of memory to perform. Furthermore, the techniques such as growing and interpolation that are used to improve the reliability and accuracy of the correlation surface analysis are more difficult to perform upon such twisted data.

SUMMARY OF THE INVENTION

It is an object of the invention to address and reduce the above mentioned problems.

Viewed from one aspect the invention provides apparatus for generating motion vectors from image data comprising:

(i) means for calculating correlation surface values representing image correlation between temporally adjacent images, each correlation surface relating to one of a plurality of portions of said temporally adjacent images;

(ii) means for providing a stream of correlation surface values comprising interleaved subsets of correlation surface values from differing correlation surfaces, each subset being a portion of a correlation surface;

(iii) a correlation surface value analyzer for receiving said stream of correlation surface values and determining partial result values for motion vectors dependent upon that part of a given correlation surface for which correlation surface values have been received;

(iv) a buffer memory for storing said partial result values from said correlation surface value analyzer between times at which correlation surface values for said given correlation surface are received and supplying said partial result values to said correlation surface value analyzer each time correlation surface values for said given correlation surface are received; and (v) means responsive to completion of receipt of correlation surface values for said given correlation surface to read final result values for motion vectors for said given correlation surface from said correlation surface value analyzer.

In this way untwisted data can be processed to generate the required motion vectors in a manner avoiding the need of large amounts of data storage capacity to reformat the data.

The buffer memory could take many different forms (e.g. RAM), but preferably said buffer memory is a first in first out memory.

A first in first out memory is able to provide the required function without the need to have to generate and apply read and write addresses.

The subsets of correlation values could be in the form of small blocks or the like, but preferably each subset is a raster line of correlation surface values from within a correlation surface.

The form of subsets as raster lines advantageously directly matches the raster format in which the image data being analyzed is often found.

Similarly, it is preferable that said stream of correlation surface values comprises data for a series of rows of correlation surfaces, data for each row of correlation surfaces comprising interleaved raster lines of correlation surface values.

In order to manage the change between the analysis of differing correlation surfaces, it is preferred to provide means for reinitialising said buffer memory after said completion.

In advantageously high speed embodiments of the invention said correlation surface value analyzer comprises a plurality of logic blocks arranged to receive said correlation surface values in parallel and each operative to calculate different partial and final result values.

Viewed from another aspect the invention provides a method of generating motion vectors from image data comprising the steps of:

(i) calculating correlation surface values representing image correlation between temporally adjacent images, each correlation surface relating to one of a plurality of portions of said temporally adjacent images;

(ii) providing a stream of correlation surface values comprising interleaved subsets of correlation surface values from differing correlation surfaces, each subset being a portion of a correlation surface;

(iii) receiving said stream of correlation surface values at a correlation surface value analyzer and determining partial result values for motion vectors dependent upon that part of a given correlation surface for which correlation surface values have been received;

(iv) storing said partial result values from said correlation surface value analyzer between times at which correlation surface values for said given correlation surface are received and supplying said partial result values to said correlation surface value analyzer each time correlation surface values for said given correlation surface are received; and (v) responsive to completion of receipt of correlation surface values for said given correlation surface, reading final result values for motion vectors for said given correlation surface from said correlation surface value analyzer.

The above, and other objects, features and advantages of this invention will be apparent from the following detailed description of illustrative embodiments which is to be read in connection with the accompanying drawings.

DESCRIPTION OF THE PREFERRED EMBODIMENTS

Figure 1:
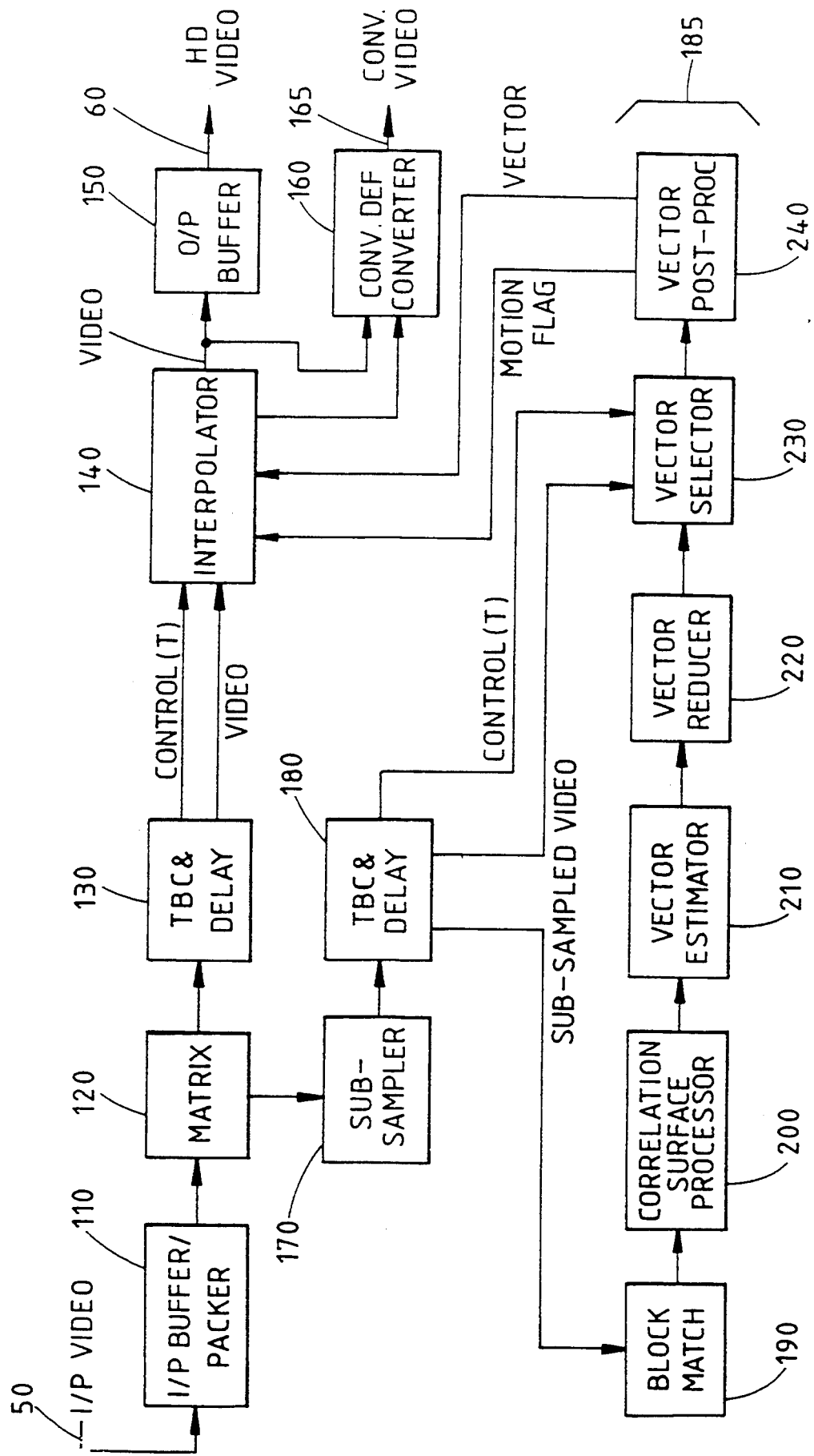
FIG. 1 is a block diagram of a motion compensated television standards conversion apparatus.

FIG. 1 is a schematic block diagram of a motion compensated television standards conversion apparatus. The apparatus receives an input interlaced digital video signal 50 (e.g. an 1125/60 2:1 high definition video signal (HDVS)) and generates an output interlaced digital video signal 60 (e.g a 1250/50 2:1 signal).

The input video signal 50 is first supplied to an input buffer/packer 110. In the case of a conventional definition input signal, the input buffer/packer 110 formats the image data into a high definition (16:9 aspect ratio) format, padding with black pixels where necessary. For a HDVS input the input buffer/packer 110 merely provides buffering of the data.

The data are passed from the input buffer/packer 110 to a matrix circuit 120 in which (if necessary) the input video signal's colorimetry is converted to the standard "CCIR recommendation 601" (Y,Cr,Cb) colorimetry.

From the matrix circuit 120 the input video signal is passed to a time base changer and delay 130, and via a sub-sampler 170 to a subsampled time base changer and delay 180. The time base changer and delay 130 determines the temporal position of each field of the output video signal, and selects the two fields of the input video signal which are temporally closest to that output field for use in interpolating that output field. For each field of the output video signal, the two input fields selected by the time base changer are appropriately delayed before being supplied to an interpolator 140 in which that output field is interpolated. A control signal t, indicating the temporal position of each output field with respect to the two selected input fields, is supplied from the time base changer and delay 130 to the interpolator 140.

The subsampled time base changer and delay 180 operates in a similar manner, but using spatially subsampled video supplied by the subsampler 170. Pairs of fields, corresponding to the pairs selected by the time base changer 130, are selected by the subsampled time base changer and delay 180 from the subsampled video, to be used in the generation of motion vectors.

The time base changers 130 and 180 can operate according to synchronisation signals associated with the input video signal, the output video signal, or both. In the case in which only one synchronisation signal is supplied, the timing of fields of the other of the two video signals is generated deterministically within the time base changers 130, 180.

The pairs of fields of the subsampled input video signal selected by the subsampled time base changer and delay 180 are supplied to a motion processor 185 comprising a direct block marcher 190, a correlation surface processor 200, a motion vector estimator 210, a motion vector reducer 220, a motion vector selector 230 and a motion vector post-processor 240. The pairs of input fields are supplied first to the direct block marcher 190 which calculates correlation surfaces representing the spatial correlation between search blocks in the temporally earlier of the two selected input fields and (larger) search areas in the temporally later of the two input fields.

From the correlation surfaces output by the block marcher 190, the correlation surface processor 200 generates a larger number of interpolated correlation surfaces, which are then passed to the motion vector estimator 210. The motion vector estimator 210 detects points of greatest correlation in the interpolated correlation surfaces. (The original correlation surfaces actually represent the difference between blocks of the two input fields; this means that the points of maximum correlation are in fact minima on the correlation surfaces, and are referred to as "minima"). In order to detect a minimum, additional points on the correlation surfaces are interpolated, providing a degree of compensation for the loss of resolution caused by the use of subsampled video to generate the surfaces. From the detected minimum on each correlation surface, the motion vector estimator 210 generates a motion vector which is supplied to the motion vector reducer 220.

The motion vector estimator 210 also performs a confidence test on each generated motion vector to establish whether that motion vector is significant above the average data level, and associates a confidence flag with each motion vector indicative of the result of the confidence test. The confidence test, known as the "threshold" test, is described (along with certain other features of the apparatus of FIG. 1) in GB-A-2 231 749. The confidence test is also discussed in more detail below.

A test is also performed by the motion vector estimator 210 to detect whether each vector is aliased. In this test, the correlation surface (apart from an exclusion zone around the detected minimum) is examined to detect the next lowest minimum. If this second minimum does not lie at the edge of the exclusion zone, the motion vector derived from the original minimum is flagged as being potentially aliased.

The motion vector reducer 220 operates to reduce the choice of possible motion vectors for each pixel of the output field, before the motion vectors are supplied to the motion vector selector 230. The output field is notionally divided into blocks of pixels, each block having a corresponding position in the output field to that of a search block in the earlier of the selected input fields. The motion vector reducer compiles a group of four motion vectors to be associated with each block of the output field, with each pixel in that block eventually being interpolated using a selected one of that group of four motion vectors.

Vectors which have been flagged as "aliased" are re-qualified during vector reduction if they are identical to non-flagged vectors in nearby blocks.

As part of its function, the motion vector reducer 220 counts the frequencies of occurrence of "good" motion vectors (i.e. motion vectors which pass the confidence test and the alias test, or which were re-qualified as non-aliased), with no account taken of the position of the blocks of the input fields used to obtain those motion vectors. The good motion vectors are then ranked in order of decreasing frequency. The most common of the good motion vectors which are significantly different to one another are then classed as "global" motion vectors. Three motion vectors which pass the confidence test are then selected for each block of output pixels and are supplied, with the zero motion vector, to the motion vector selector 230 for further processing. These three selected motion vectors are selected in a predetermined order of preference from:

(i) the motion vector generated from the corresponding search block (the "local" motion vector");

(ii) those generated from surrounding search blocks ("neighbouring" motion vectors); and (iii) the global motion vectors.

The motion vector selector 230 also receives as inputs the two input fields which were selected by the subsampled time base changer and delay 180 and which were used to calculate the motion vectors. These fields are suitably delayed so that they are supplied to the motion vector selector 230 at the same time as the vectors derived from them. The motion vector selector 230 supplies an output comprising one motion vector per pixel of the output field. This motion vector is selected from the four motion vectors for that block supplied by the motion vector reducer 220.

The vector selection process involves detecting the degree of correlation between test blocks of the two input fields pointed to by a motion vector under test. The motion vector having the greatest degree of correlation between the test blocks is selected for use in interpolation of the output pixel. A "motion flag" is also generated by the vector selector. This flag is set to "static" (no motion) if the degree of correlation between blocks pointed to by the zero motion vector is greater than a preset threshold.

The vector post-processor reformats the motion vectors selected by the motion vector selector 230 to reflect any vertical or horizontal scaling of the picture, and supplies the reformatted vectors to the interpolator 140. Using the motion vectors, the interpolator 140 interpolates an output field from the corresponding two (non-subsampled) interlaced input fields selected by the time base changer and delay 130, taking into account any image motion indicated by the motion vectors currently supplied to the interpolator 140.

If the motion flag indicates that the current output pixel lies in a moving part of the image, pixels from the two selected fields supplied to the interpolator are combined in relative proportions depending on the temporal position of the output field with respect to the two input fields (as indicated by the control signal t), so that a larger proportion of the nearer input field is used. If the motion flag is set to "static" then the temporal weighting is fixed at 50% of each input field. The output of the interpolator 140 is passed to an output buffer 150 for output as a high definition output signal, and to a down-converter 160 which generates a conventional definition output signal 165, using the motion flag.

The down-converter 160 allows a representation of the output of the apparatus (which may be, for example, a high definition video signal) to be monitored, transmitted and/or recorded using conventional definition apparatus. This has benefits because conventional definition recording equipment is significantly cheaper and very much more widespread than high definition equipment. For example, a simultaneous output of conventional and high definition video may be required for respective transmission by terrestrial and satellite channels. Furthermore, if the output video signal is recorded directly onto film using, for example, an electron beam recorder, the down-converter allows a simultaneous recording to be made onto video tape.

The subsampler 170 performs horizontal and vertical spatial subsampling of the input video fields received from the matrix 120, before those input fields are supplied to the time base changer 180. Horizontal subsampling is a straightforward operation in that the input fields are first prefiltered by a half-bandwidth low pass filter (in the present case of 2:1 horizontal decimation) and alternate video samples along each video line are then discarded, thereby reducing by one half the number of samples along each video line.

Vertical subsampling of the input fields is complicated by the fact that the input video signal 50 is interlaced. This means that successive lines of video samples in each interlaced field are effectively two video lines apart, and that the lines in each field are vertically displaced from those in the preceding or following field by one video line of the complete frame.

One approach to vertical subsampling would be to perform progressive scan conversion (to generate successive progressively scanned video frames each having 1125 lines) and then to subsample the progressively scanned frames by a factor of 2 to perform the vertical subsampling. However, efficient progressive scan conversion would require a degree of motion compensated processing, which processing could adversely affect the operation of the motion processor 185. Furthermore, real-time progressive scan conversion of a high definition video signal would require particularly powerful and complex processing apparatus.

A simpler approach to vertical spatial subsampling is one in which the input fields are first low pass filtered in the vertical direction (to avoid aliasing) and a filtering operation is then performed which effectively displaces each pixel vertically by half a video line downwards (for even fields) or upwards (for odd fields). The resulting displaced fields are broadly equivalent to progressively scanned frames which have been subsampled vertically by a factor of two.

In summary, therefore, the result of the subsampling operations described above is that the motion processor 185 operates on pairs of input fields which are spatially subsampled by a factor of two in the horizontal and the vertical directions. This reduces the processing required for motion vector estimation by a factor of four.

Figure 2:
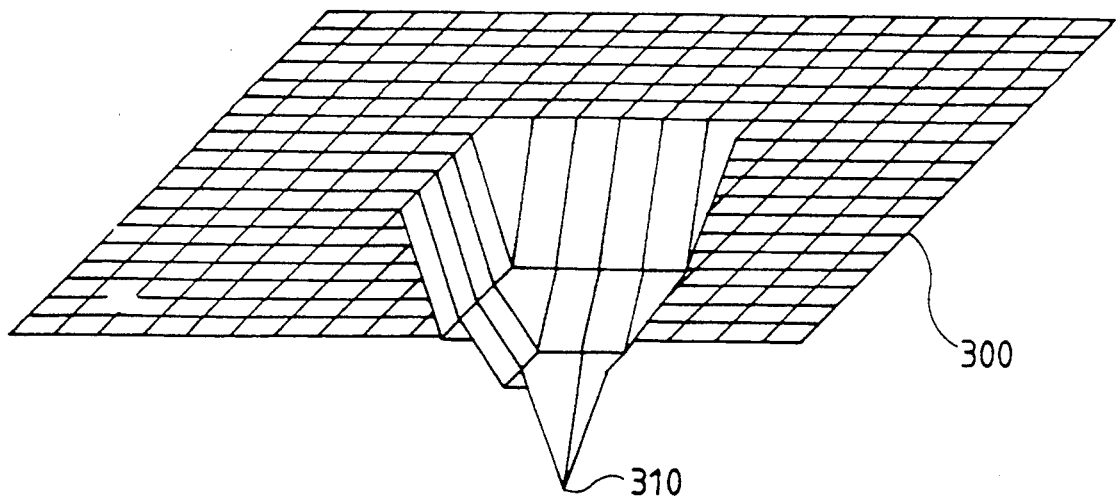
FIG. 2 is an illustration of a correlation surface.

FIG. 2 is a schematic diagram of a correlation surface 300. The correlation surface represents the difference between a search block of the earlier of the two input fields from which the surface is generated, and a (larger) search area in the later of the two input fields. A peak in correlation is therefore represented by a minimum point 310 on the correlation surface 300. The position of the minimum point 310 on the correlation surface 300 determines the magnitude and direction of the motion vector derived from that correlation surface.

In the apparatus of FIG. 1, each motion vector is generated by detecting a minimum point on a respective correlation surface. In total, for each pair of input fields supplied to the motion processor 185, eight thousand correlation surfaces are supplied to the vector estimator 210 for use in the generation of eight thousand motion vectors.

In order to reduce the processing requirements of the apparatus of FIG. 1, only one quarter of the total number of correlation surfaces are generated by the comparison of blocks of the two sub-sampled input fields supplied to the block marcher 190. The correlation surfaces to be used in motion vector generation are then interpolated from the correlation surfaces generated by block matching. This means that two thousand "original" correlation surfaces are generated by the block marcher 190 and supplied to the correlation surface processor 200; the correlation surface processor 200 then generates eight thousand "interpolated" correlation surfaces from the two thousand original correlation surfaces, for use in motion vector estimation.

Figure 3:
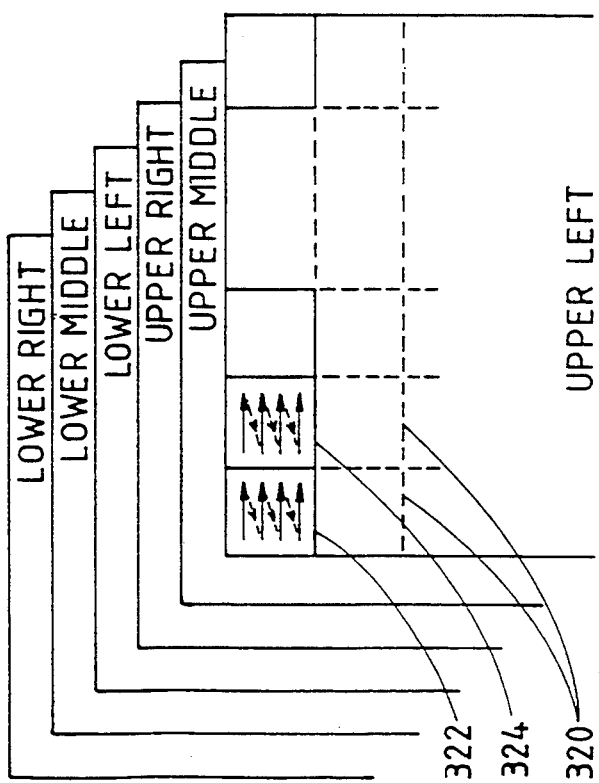
FIG. 3 is a schematic diagram of correlation surface data in a twisted format.

FIG. 3 schematically illustrates correlation surface data in the previously proposed twisted format (correlation surface sequential). The correlation surface data for a given image field to be interpolated is split into six sections: upper left, upper middle, upper right, lower left, lower middle and lower right. Each of these portions contains a plurality of correlation surfaces 320. The correlation surface data is a sequential data stream in which the order follows a raster scan pattern through each individual correlation surface, i.e. the correlation surface data stream raster scans through correlation surface 322 and then raster scans through correlation surface 324. In this way, the entire correlation surface analysis for correlation surface 322 is performed in one go prior to the same operations being performed on the following correlation surface 324.

Figure 4:
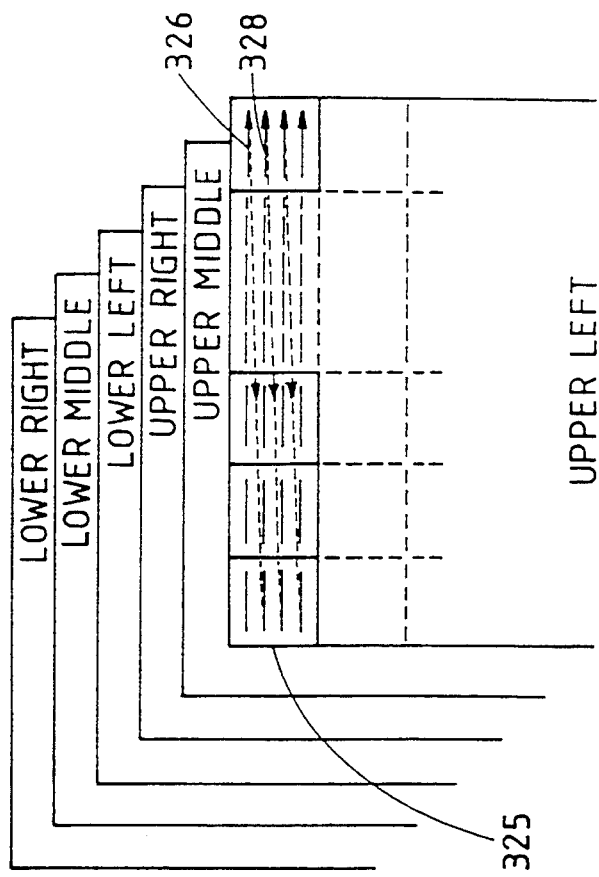
FIG. 4 is a schematic diagram of correlation surface data in a non-twisted format.

FIG. 4 illustrates the correlation surface data in a non-twisted format (non-correlation surface sequential format). The correlation surface data for the whole output image field to be interpolated is still split into six portions, but within each of these portions a full width raster scan is performed. Thus, for the first row 325 of correlation surfaces within the upper left portion, the first raster line 326 of correlation surface data values is sequentially supplied as the data stream prior to the second raster line 328 of correlation surface data values. The first raster line 326 is formed of interleaved subsets of correlation surface values, each subset being an intra-correlation surface raster line such as shown in FIG. 3. This interleaving of the correlation surface values from different correlation surfaces presents the challenge of how this data stream can be effectively analyzed.

Figure 5:
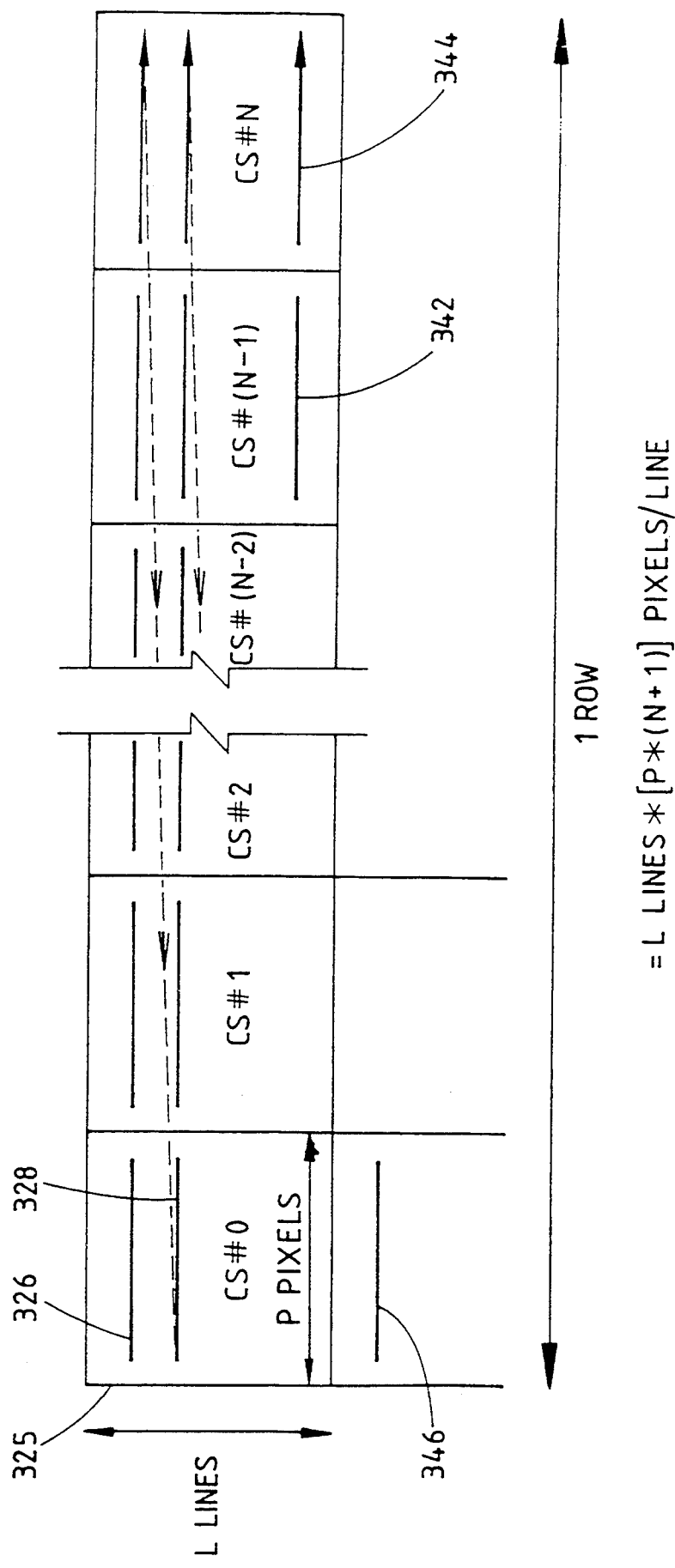
FIG. 5 illustrates a row of correlation surfaces in the format of FIG. 4.

FIG. 5 illustrates the top row of correlation surfaces in the format of FIG. 4 in more detail. In particular, the top row of correlation surfaces contains (N+1) correlation surfaces, CS#0 to CS#N. Each of these correlation surfaces contains 1 raster lines, with each line having p pixels, each pixel being a correlation surface data value. Thus, the top row 325 of correlation surfaces contains l*p* (N+1) correlation surface values. These correlation surface values are processed in a data stream having a raster scanning order across the entire row 325 of correlation surfaces as illustrated.

Figure 6:
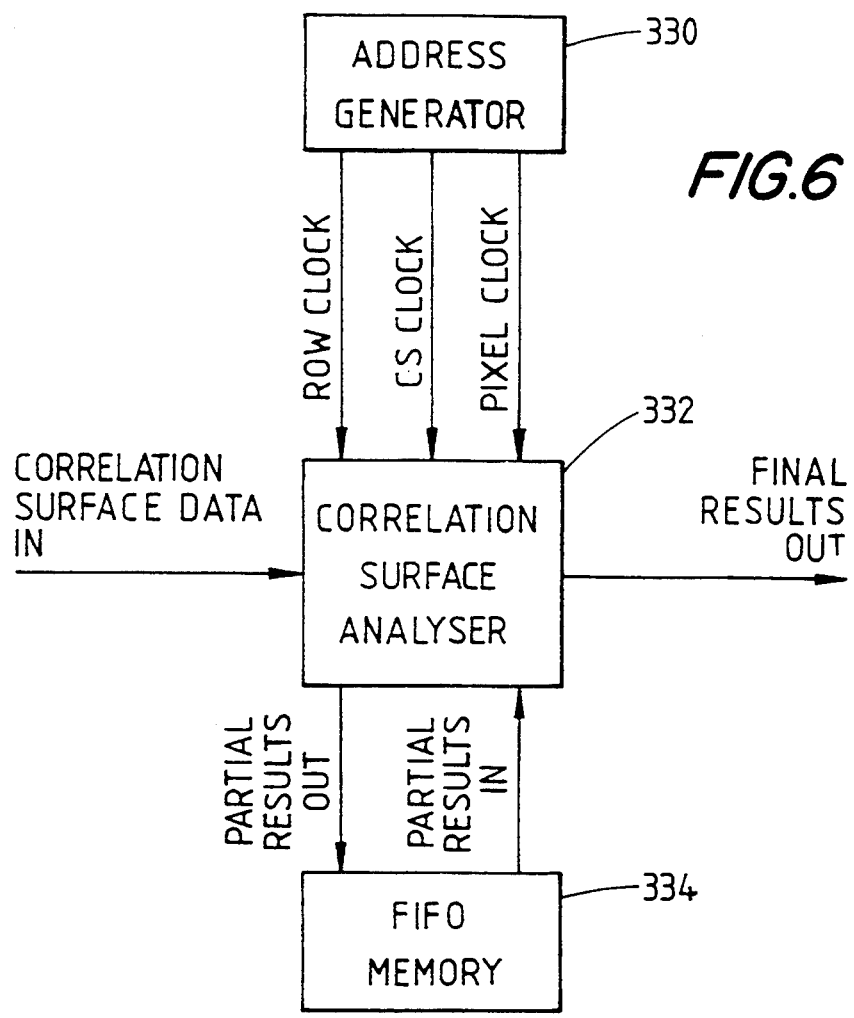
FIGS. 6 and 7 are schematic diagrams of a correlation surface apparatus operable with data in the format illustrated in FIGS. 4 and 5.
Figure 7:
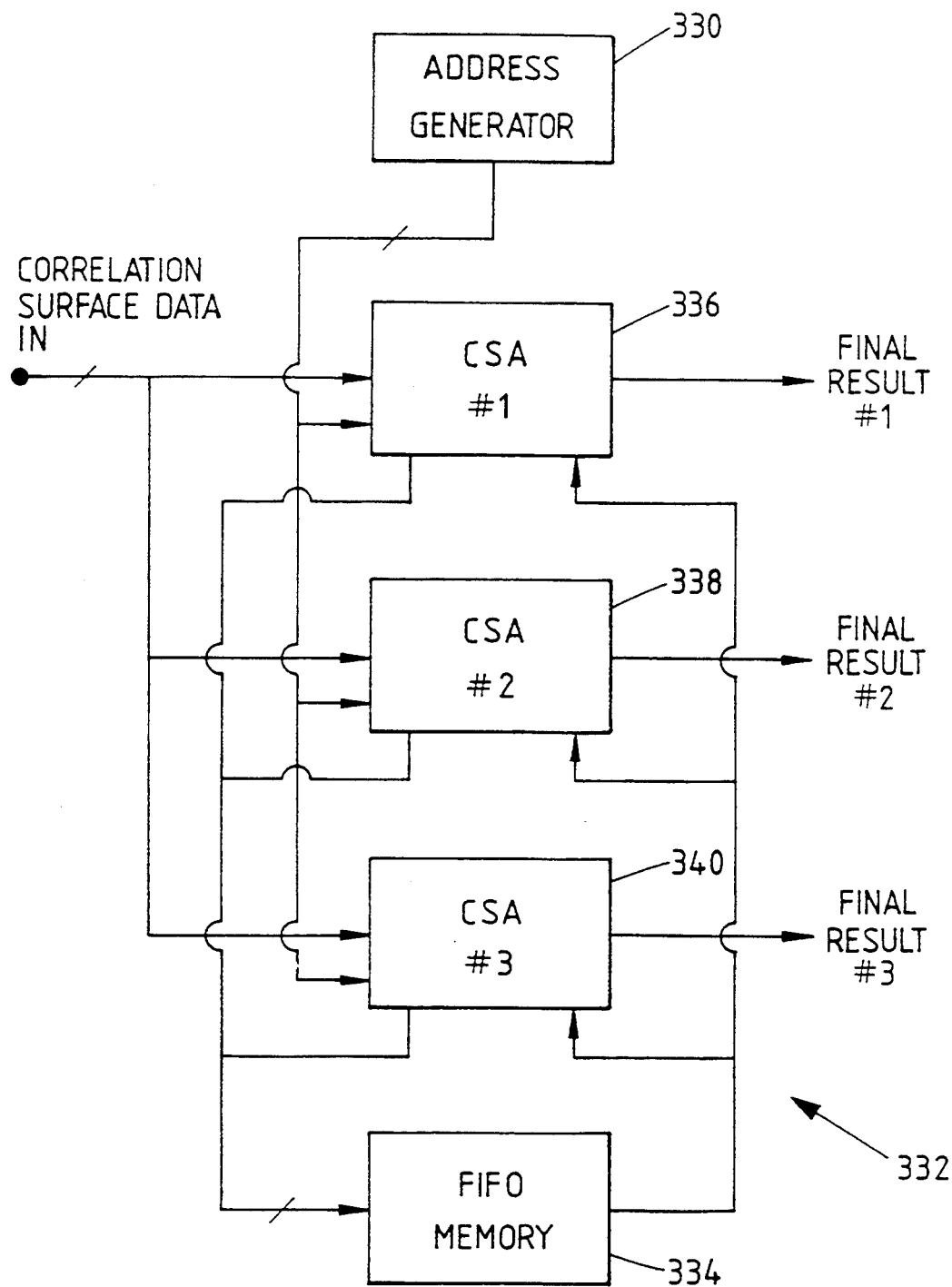

FIGS. 6 and 7 illustrate apparatus for performing correlation surface analysis upon a stream of data having the format illustrated in FIGS. 4 and 5. The apparatus of FIGS. 6 and 7 forms part of the vector estimator 210 of FIG. 1. The apparatus comprises an address generator 330 supplying a row clock signal, a correlation surface clock signal and a correlation surface value (pixel) clock signal to a correlation surface analyzer logic block 332. The correlation surface analyzer logic block 332 is coupled to a first in first out (FIFO) memory 334 in which partial results are buffered whilst the interleaved correlation surface data is fed to the correlation surface analyzer logic block 332.

In operation, the correlation surface data stream supplies a raster line from each correlation surface in turn to the correlation surface analyzer logic block 332. In this way, for each correlation surface, a small part of the analysis is performed and then a small part of the analysis of the following block is performed in turn until the end of a complete row 325 of correlation surfaces as illustrated in FIG. 5. At the completion of a row 325 the analysis for each correlation surface within the row 325 is also completed and the currently prevailing correlation maximum values for each of the correlation surfaces will represent the final result; these values are read from the correlation surface analyzer logic block 332 and may then be used to generate the motion vectors. Correlation maximum is only one of the analyses performed upon the correlation surfaces, others being such as the position and value of the next greatest correlation maximum within the surface, the gradients at these points of correlation maxima and other parameters.

As the analysis of each correlation surface is effectively interrupted due to the untwisted/interleaved format of the data stream, the FIFO memory 334 provides temporary storage/buffering for the partial results until the next data for that correlation surface is input to the correlation surface analyzer logic block 332. The clocking of the FIFO memory 334 is derived from the clocking of the correlation surface data into the system in a manner in which the partial results already calculated are output from the FIFO memory 334 to the correlation surface analyzer logic block 332 synchronism for them to be used during the analysis of the next correlation surface data values for that correlation surface.

FIG. 7 illustrates the circuit of FIG. 6 in more detail. In particular, the correlation surface analyzer logic block 332 can be seen to comprise a plurality of separate logic blocks 336, 338 and 340 each performing a different specific analysis upon the correlation surface data input to it, e.g. correlation maximum, gradient, next greatest correlation maximum. The FIFO memory 334 outputs the partial results to date for a given correlation surface to the appropriate ones of the logic blocks 336, 338 and 340 as the correlation surface data for that given correlation surface starts to be input. At he end of the row 325 the final results are read from the logic blocks 336, 338 and 340.

Figure 8:
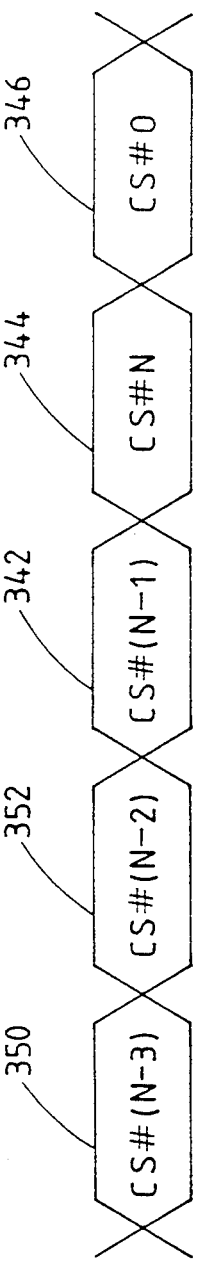
FIGS. 8(A–E) illustrates the relative timing of various signals within the apparatus of FIGS. 6 and 7.
Figure 8:
Figure 8:
Figure 8:
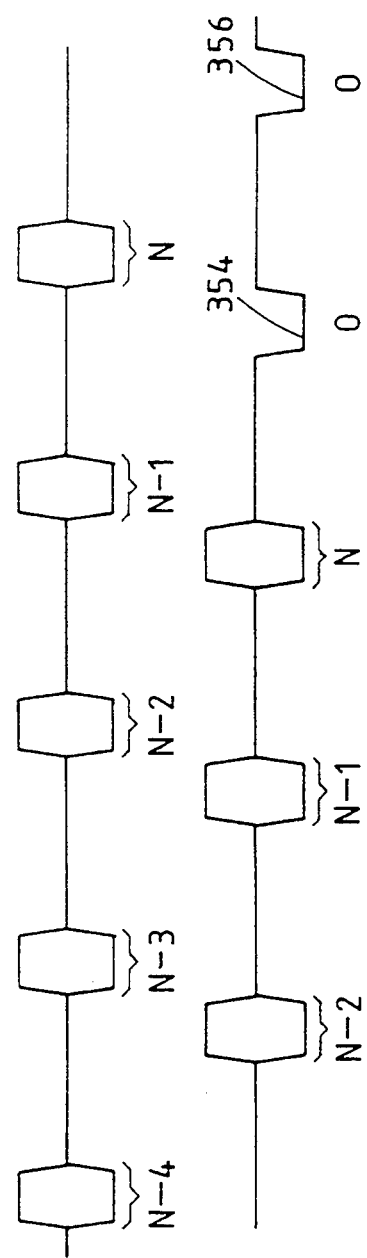
Figure 8:
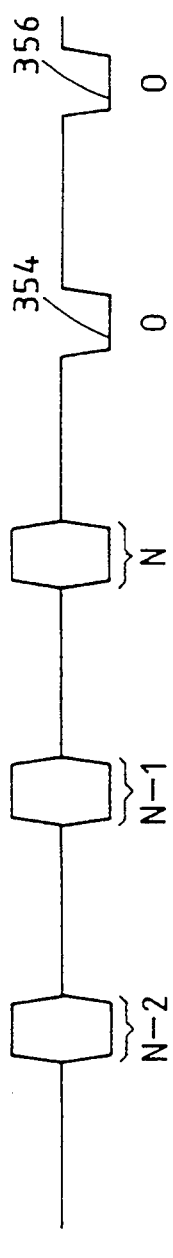

FIG. 8 illustrates the timing of various signals within the circuits of FIGS. 6 and 7. The top signal represents the envelope of the correlation surface values input, The sequences of correlation surface values 342, 344 and 346 are equivalent to the correspondingly numbered interleaved subsets of correlation surface values within the correlation surfaces illustrated in FIG. 5. More particularly, subsets 342 and 344 are the last of the data from the complete row 325 of correlation surfaces whilst the subset 346 is the first data for a new row.

The next signal is the correlation surface clock signal which has a period corresponding to the period in which the data from the input correlation surface data stream switches the correlation surface from which it originates. This correlation surface clock is used to control the operation of the FIFO memory 334.

The next signal is a row clock. The row clock is used to indicate when a row 325 of correlation surfaces, such as illustrated in FIG. 5, comes to an end. At such a point 348, the contents of the FIFO memory 334 can be initialised since the partial results it contains are no longer required as a new row of correlation surfaces is now to be analyzed.

The next signal illustrates the envelope of the data output to the FIFO memory 334. This is the partial result values to date for each correlation surface and is output to the FIFO immediately following the analysis of each subset of correlation surface values 342, 344. Thus, the partial result values for correlation surface CS#(N−3) are output to the FIFO memory 334 immediately after the analysis of the subset 350 from correlation surface CS#(N−3).

The final signal represents the envelope of the partial result values output from the FIFO memory 334 to the correlation surface analyzer logic block 332. The partial result values to date for each correlation surface are output from the FIFO memory 334 just before the next subset of correlation values for that correlation surface arrives. Thus, the partial result values for correlation surface CS#(N−2) are input to the correlation surface analyzer logic block 332 immediately prior to receipt of the subset 352. It is of note that when the end of a row of correlation surfaces (such as illustrated in FIG. 5), is reached, then the FIFO memory 334 is initialised. This is illustrated by the zero partial results values 354 and 356 input prior to the analysis of the correlation surfaces CS#0 and CS#1 that form the first of a new row of correlation surfaces.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

I claim:

1. Apparatus for generating motion vectors from image data comprising:
    (i) means for calculating correlation surface values representing image correlation between temporally adjacent images, each correlation surface relating to one of a plurality of portions of said temporally adjacent images;
    (ii) means for providing a stream of correlation surface values comprising interleaved subsets of correlation surface values from differing correlation surfaces, each subset being a portion of a correlation surface;
    (iii) a correlation surface value analyzer for receiving said stream of correlation surface values and determining partial result values for motion vectors dependent upon that part of a given correlation surface for which correlation surface values have been received;
    (iv) a buffer memory for storing said partial result values from said correlation surface value analyzer between times at which correlation surface values for said given correlation surface are received and supplying said partial result values to said correlation surface value analyzer each time correlation surface values for said given correlation surface are received; and
    (v) means responsive to completion of receipt of correlation surface values for said given correlation surface to read final result values for motion vectors for said given correlation surface from said correlation surface value analyzer.

2. Apparatus as claimed in claim 1, wherein said buffer memory is a first in first out memory.

3. Apparatus as claimed in claim 1, wherein each subset is a raster line of correlation surface values from within a correlation surface.

4. Apparatus as claimed in claim 3, wherein said stream of correlation surface values comprises data for a series of rows of correlation surfaces, data for each row of correlation surfaces comprising interleaved raster lines of correlation surface values.

5. Apparatus as claimed in claim 1, comprising means for reinitialising said buffer memory after said completion.

6. Apparatus as claimed in claim 1, wherein said correlation surface value analyzer comprises a plurality of logic blocks arranged to receive said correlation surface values in parallel and each logic block operative to calculate different partial and final result values.

7. A method of generating motion vectors from image data comprising the steps of:
    (i) calculating correlation surface values representing image correlation between temporally adjacent images, each correlation surface relating to one of a plurality of portions of said temporally adjacent images;
    (ii) providing a stream of correlation surface values comprising interleaved subsets of correlation surface values from differing correlation surfaces, each subset being a portion of a correlation surface;
    (iii) receiving said stream of correlation surface values at a correlation surface value analyzer and determining partial result values for motion vectors dependent upon that part of a given correlation surface for which correlation surface values have been received;
    (iv) storing said partial result values from said correlation surface value analyzer between times at which correlation surface values for said given correlation surface are received and supplying said partial result values to said correlation surface value analyzer each time correlation surface values for said given correlation surface are received; and
    (v) responsive to completion of receipt of correlation surface values for said given correlation surface, reading final result values for motion vectors for said given correlation surface from said correlation surface value analyzer.

8. A method as claimed in claim 7, wherein each subset is a raster line of correlation surface values from within a correlation surface.

9. A method as claimed in claim 8, wherein said stream of correlation surface values comprises data for a series of rows of correlation surfaces, data for each row of correlation surfaces comprising interleaved raster lines of correlation surface values.

* * * * *

UNITED STATES PATENT AND TRADEMARK OFFICE
CERTIFICATE OF CORRECTION

PATENT NO. : 5,442,409

DATED : Aug. 15, 1995

INVENTOR(s) : Morgan

It is certified that error appears in the above-identified patent and that said Letters Patent is hereby corrected as shown below:

On the Title Page,

Item [73] Assignee: Sony United Kingdom Limited, Staines, England

Signed and Sealed this

Twenty-ninth Day of May, 2001

Attest:

NICHOLAS P. GODICI

*Attesting Officer*  *Acting Director of the United States Patent and Trademark Office*